E. & L. E. BALTZLEY.
CULINARY BEATER.
APPLICATION FILED JULY 21, 1914.
1,220,928.
Patented Mar. 27, 1917.
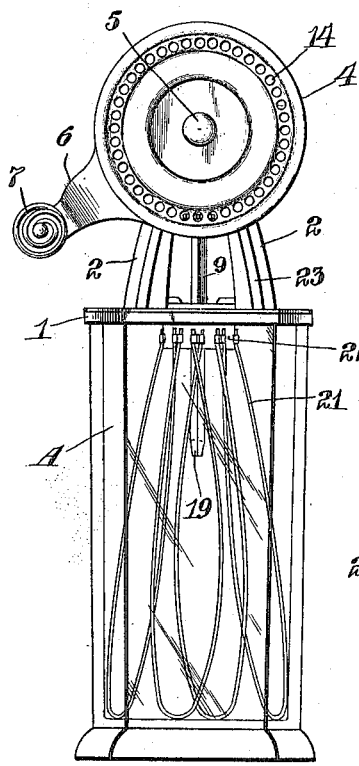
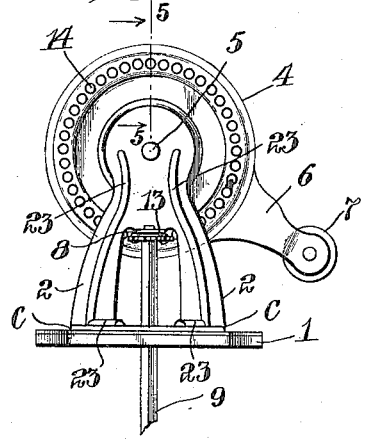
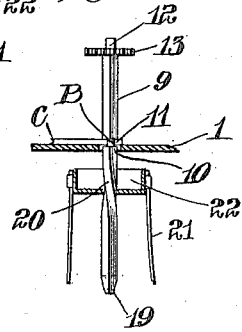
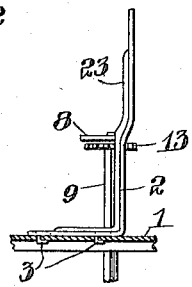
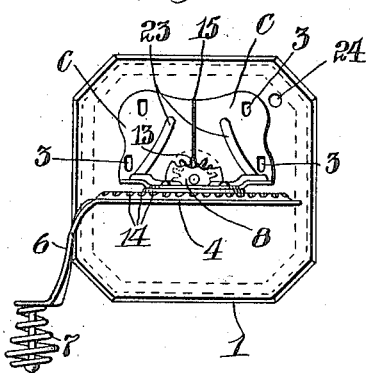
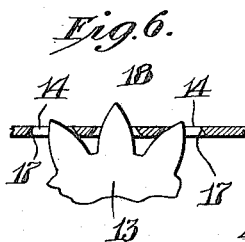
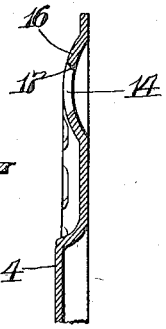
Attest:
Inventors
Edwin Baltzley
Louis E. Baltzley

UNITED STATES PATENT OFFICE.

EDWIN BALTZLEY AND LOUIS E. BALTZLEY, OF WEEHAWKEN, NEW JERSEY, ASSIGNORS TO EDWARD D. FARMER, TRUSTEE, OF MONTCLAIR, NEW JERSEY.

CULINARY BEATER.

1,220,928.          Specification of Letters Patent.          Patented Mar. 27, 1917.

Application filed July 21, 1914. Serial No. 852,200.

*To all whom it may concern:*

Be it known that we, EDWIN BALTZLEY and LOUIS E. BALTZLEY, citizens of the United States, residing at Weehawken, in the county of Hudson and State of New Jersey, have invented certain new and useful Improvements in Culinary Beaters, of which the following is a specification.

The invention relates to that class of culinary beaters set forth in the former patent of Edwin Baltzley No. 332,375 dated December 15th, 1885, and has for its object the production of a self contained culinary beater, which will be independent of any collateral bracket for holding it, but be dependent only upon a square or other angular or scalloped jar for such purpose, which said jar is also the vessel in which the whips of the beater do the beating, the angular or scalloped shape of it being specially designed to coöperate with the whips, being pendant spring wire loops expansible by centrifugal force, to increase their efficiency in action on the substance to be beaten. If the jar was round, the whips would drive the egg, or other substance to be beaten, before it, and get little action thereon. But in the angular or scalloped shaped jar, the whips fly out by centrifugal force, to the sides of the jar, carrying the substance to be beaten with them, and thereby concentrate said substance in the peripheral path of the whips, thereby causing the sides of the jar to coöperate with the whips for more effective beating. But if the jar was round, the whips and substance would travel together. This is prevented by the corners or scallops of the jar into which the substance is forced by centrifugal force and held there while the whips cut through it and pass on. The whips also fly into the corners to a degree, and out of a true circular path, but are forced back again by striking the sides of the vessel after passing into each corner. This action sets up a violent vibration of the pendant spring whips, thereby vastly increasing the action of the whips on the substance, filling it with minute air cells. The scalloped form of the jar, admits of more angles or more recesses and projections for the whips to fly into and out and thereby vastly increases the number of vibrations of the whips to more rapidly do the work, and also to increase the number of minute air cells. These air cells are so small that they do not readily break down when the substance is mixed with other ingredients, and thus take the place, when heated, of baking powder to a degree.

Another object is to make a smoothly operating stamped gear that will not skip a cog under strain, and to provide an inexpensive but durable and efficient construction. Also it is desirable in the art to which the present invention relates to provide a beater in which the whipping mechanism will remain at the bottom of the jar or container and thus thoroughly whip small as well as large quantities of food.

In an application recently filed by Edwin Baltzley, one of the joint inventors hereto, Serial No. 789,269, filed September 11, 1913, there is described and claimed a culinary beater in which the whips are arranged in slidable vertical relation with the operating rod in order that they may rest on the bottom of the jar. This is a very satisfactory construction for some purposes but at times there is a tendency for the whips to work upwardly and this is particularly so when heavy batters or the like are being whipped. In the present invention this tendency of the whips to work upwardly is overcome by means of a peculiar construction of the rod as will more fully hereinafter appear.

This invention provides a culinary beater in which the operating parts may be made of stamped sheet metal. The gear and pinion, the bracket and the top are so shaped and arranged to be easily assembled and to afford a firm and strong combination of motion transmitting mechanism.

In the drawings Figure 1 is a front view of the device assembled, and all in readiness for beating;

Fig. 2 is a back view of the cap and driving mechanism;

Fig. 3 is a top plan of the cap and driving mechanism;

Fig. 4 is a cross section of the top showing the means of fastening the gear wheel bracket to the top;

Fig. 5 is an enlarged cross section of a portion of the gear wheel along the line 5—5, Fig. 2 showing the gear holes;

Fig. 6 is an enlarged section showing the pinion meshing with the gear;

Fig. 7 is a segmental view of the shaft, pinion, beater head and cap, partly in section and partly in elevation, and, Fig. 8 is a top plan showing the scallop form of the jar.

Referring to the drawing, A indicates a jar which is preferably approximately square in cross section, though it may be angular scalloped in form as we have found that in such jars the tendency of the contents to creep upwardly when rotated continuously in one direction is overcome. The jar is provided with a top 1 made of sheet metal and stamped in a form to fit the jar. This top is the sole supporting means of the motion transmission mechanism. The motion transmission mechanism includes an operating rod and gear wheel and a pinion connecting the rod and the gear wheel together with a handle for rotating the gear. This mechanism is supported on the top by means of the bracket comprising standards 2, foot rest or plate C, and a flat extension forming bearings for the gear and pinion. The extension provides for a large area of surface contact between the bracket and the face of the gear wheel. The standards 2 and the foot plate are preferably reinforced as at 23. In order to maintain the bracket in position on the top of the jar and for ease in assembling, it is provided with a plurality of stamped out tangs or lugs 3 which are inserted in corresponding holes on the top and which are clenched under the top as is clearly shown in Fig. 4. Shelf 8 is preferably integral with the bracket at a substantially right angle and has a hole which serves for the reception and retention and forms a bearing for the upper end of the whip rod. The foot plate is stamped to form a bearing B for the rod and the top of the jar is stamped in order that the rod may operate therein. The stamped out hole of the top is larger than the stamped hole in the foot of the bracket and thus the rod is maintained in place because of the shoulder resulting from the reduced portion. The rod is reduced at B to form a journal. The foot of the bracket is split longitudinally as at 15 and in assembling is spaced apart slightly to permit insertion of the rod, whereupon it is sprung back in place and clenched to the top by means of the tangs 3 as explained. The hole in the top or cap may be of the same size as the one in the foot. But in this case the top or cap must be split from the hole outward so as to permit it to be sprung apart for insertion of the journal from the outside to and into the hole, the same as in the foot plate. This rod also is keyed at a point toward the top and is provided with a pinion 13. The upper portion of the rod beyond the key forms a shaft which is suitably journaled in the bearing of the shelf 8 heretofore referred to. The shelf is preferably longer than the diameter of the pinion in order that it may serve as a guard as is clearly shown in Fig. 4.

The gear 4 is stamped from sheet metal and is pivoted at 5 as has been explained. The arm 6 is preferably stamped integral with the gear and is provided with the handle 7 which is here shown as the usual twisted wire. This gear is of peculiar construction. It is made from a flat section of sheet metal, which is first stamped to provide holes 14, which leaves metal between them to form cogs. The sides of the holes should be beveled so that the teeth of the pinion may enter and pass through them as far as possible to secure sufficient contact between the teeth and cogs. This provides against the pinion slipping out of the holes or skipping when under strain. The metal in the path of the holes 14 is stamped or formed by rounding up from the inside as shown at 16 (Fig. 5). This contracts the metal around the holes on the concave side 6, expands it on the convex side, forming the bevels 17, and admits teeth 18 of the pinion. These teeth are narrow at the point and broad at their base. This construction provides for accurate meshing of the gear and pinion. It results in a reinforcement for the disk gear and provides a seat on the face of the gear for the upper portion of the bracket.

The whips are preferably made of music wire and are attached to a rotary head 22 in any convenient manner. The rotary head 22 has a square hole in its center to receive a shaft 9 so that it is revolved when the gear wheel is rotated. The shaft 9 is twisted as at 20 along its length a sufficient distance and thus the rotary head is operated by the twisted portion. The arrangement forms in effect a screw and holds the whip to the bottom of the jar through all degrees of resistance from that presented by operation upon eggs to that of heavy batters. The greater the resistance of the substance tending to force the whip up the greater is the screw action for forcing it down, because the square shaft neatly fits in the square hole in the beater head, and the faster the gear is operated the greater is the tendency for the screw rod to act upon the rotary head. When there is no resistance the whips rest by gravity on the bottom of the jar. The lower end of the shaft 9 is beveled to a joint 19 on its four sides so as to facilitate its entrance into the coupling hole of the whip head. A hole 24 is eyeleted through the top of the cap 1 to receive and hold an oil, or mayonnaise dressing dropper.

What we claim is:—

1. In a culinary beater, a container, a top having means for supporting a bracket, a bracket formed with a comparatively broad foot rest, consisting of yielding separated portions which may be sprung apart for insertion of a shaft, means to secure the foot rest to the top, and operating mechanism supported in the bracket, said operating mechanism including a shaft extending through the top and the yielding portions of the foot rest.

2. In a culinary beater, a container, a top for the container having a hole for the reception of a shaft, a bracket supported on said top and provided with a foot rest having a hole of smaller diameter than the diameter of the hole in the top and in line therewith, an extension carried by the bracket, operating mechanism for the beater supported in said extension, and a shaft passing through both of said holes and reduced at a point along its length for engagement with the walls of the hole in said foot rest to limit the axial movement of the shaft in one direction.

3. In a culinary beater, a container and whipping mechanism therefor, said whipping mechanism comprising a beater head having depending beaters and shaft engaging means, a rotatable shaft, means to hold the shaft against axial movement, and means for rotating the same, said shaft having means engaging the beater head to constantly force the beaters toward the bottom of the container during continuous rotation of the shaft.

4. In a culinary beater, a container and whipping mechanism therefor, said whipping mechanism comprising a beater head having depending beaters and shaft engaging means, a shaft, means to hold the shaft against axial movement, and means for rotating the same, said shaft being twisted to form a screw immediately engaging the beater head to force the beaters toward the bottom of the container during continuous rotation of the shaft.

5. In a culinary beater a cap, a bracket attached thereto, a gear wheel journaled to said bracket, an angular shaft journaled in said bracket and carrying a pinion to mesh with said gear wheel, said shaft being twisted below said cap, means to hold the shaft against axial movement, and a whip having a rotatory head slidable on said twisted portion, the latter tending to force the whip downwardly upon rotation of the shaft.

In testimony whereof, we affix our signatures in the presence of witnesses.

EDWIN BALTZLEY.
LOUIS E. BALTZLEY.

Witnesses:
ELLA F. BRAMAN,
FRED H. WILSON.

Copies of this patent may be obtained for five cents each, by addressing the "Commissioner of Patents, Washington, D. C."